Patented Jan. 30, 1945

2,368,113

UNITED STATES PATENT OFFICE 2,368,113

METHOD OF MAKING LIQUID EXTRACTS

Clinton W. Carter, Allison Park, Pa.

No Drawing. Application February 2, 1944,
Serial No. 520,775

2 Claims. (Cl. 99—71)

This invention relates to a new and useful method of making liquid extracts from coffee or other soluble products which in the main employs the steps of my method of making a liquid coffee extract disclosed in Patent No. 2,334,171, issued to me November 16, 1943.

That method consists of mixing a ground or comminuted substance to be extracted with a moisture absorbent inert substance such as a filter mass to promote expansion of the ground or comminuted substance without compacting so that the extracting liquids pass uniformly through the mass to produce an extract. I have discovered that instead of employing a comminuted filter mass for mixing with the ground coffee that the advantages of my aforementioned patented method are obtainable by mixing the powderous material with the same or other materials of a different form to produce a stratification of the powderous material to a degree to prevent packing when the mass swells during the extracting step.

For example I have found that if coffee is ground to a medium fineness and slightly moistened and rolled it will flatten into flakes similar to flaked cereals. This flaked coffee may be produced for the purpose of increasing the yield of the coffee due to the exposure of the larger surface area of coffee to the coffee making liquid.

I have found that such flaked coffee, when employed alone in the making of concentrated liquid coffee extract, is unsatisfactory in that it will set up a straight line flow of the percolating liquid from the top of the container to the outlet even to a greater degree than if powdered coffee alone were used without the filter mass.

I have found that by mixing the rolled flaked coffee with the finely ground coffee in the proportion of from 15% to 30% of flaked coffee the direct line flow of the liquid through the mass will be interrupted as a result of a stratification throughout the coffee mass which prevents compacting. The advantages of employing the coffee flake instead of an inert filter substance such as a comminuted, fibrous filter material referred to in the above mentioned patent are that the extracting apparatus will have a greater capacity per unit volume when employing the flaked coffee with the finely ground coffee because all of the mass is subjected to the extracting process there being no inert substance contained therein.

The finely ground and flaked coffee may be mixed in a dry form or they may be slightly moistened for mixing and enough moisture is added while mixing until the water is uniformly absorbed. The mixture is then transferred to a percolator having an open outlet at the base thereof. Water heated to the boiling point is sprayed on the surface of the coffee so that all parts receive the same amount of water. Spraying is continued at the rate at which it will pass through the coffee mass. No water should be permitted to accumulate on the surface of the coffee being sprayed but enough should be employed to produce a continuous extracting effect uniformly and evenly throughout the mass. These steps of the process are similar to the steps described in my aforementioned patent to produce a desired specific capacity for a given volume of the water used in extracting.

I claim:

1. The method of making liquid coffee extracts which embraces mixing a finely ground freshly roasted coffee with a flaked roasted coffee, adding water to the dry coffee while mixing the same to completely absorb the water and subjecting the mass to a continuous flow of hot water to obtain an average concentration of a predetermined specific capacity.

2. The method of making liquid coffee extract which embraces the mixing of finely ground freshly roasted coffee with a flaked roasted coffee in the proportion of from 15% to 30% coffee flakes and the balance of finely ground coffee, adding water to the dry coffee while mixing the same and subjecting the mass to a continuous flow of hot water to obtain a liquid extract of a predetermined average specific gravity.

CLINTON W. CARTER.